(12) United States Patent
Peers-Smith

(10) Patent No.: US 9,621,300 B2
(45) Date of Patent: Apr. 11, 2017

(54) COMMUNICATIONS SYSTEM

(71) Applicant: Kirintec Limited, Ross-on-Wye (GB)

(72) Inventor: Roy Peter Peers-Smith, Ross-on-Wye (GB)

(73) Assignee: Kirintec Limited, Herefordshire (GB)

( * ) Notice: Subject to any disclaimer, the term of this patent is extended or adjusted under 35 U.S.C. 154(b) by 423 days.

(21) Appl. No.: 14/245,581

(22) Filed: Apr. 4, 2014

(65) Prior Publication Data
US 2016/0294501 A1    Oct. 6, 2016

(30) Foreign Application Priority Data

Apr. 5, 2013  (GB) .................................. 1306148.6
Jul. 11, 2013  (GB) .................................. 1312447.4

(51) Int. Cl.
*H04K 3/00*   (2006.01)
*H04B 1/525*  (2015.01)

(52) U.S. Cl.
CPC ............... *H04K 3/28* (2013.01); *H04B 1/525* (2013.01); *H04K 3/41* (2013.01); *H04K 3/45* (2013.01);
(Continued)

(58) Field of Classification Search
USPC ............................................................ 455/1
See application file for complete search history.

(56) References Cited

U.S. PATENT DOCUMENTS 7,826,839 B1 * 11/2010 Nicholas .................. H04K 3/28
                                                           342/14
2004/0214520 A1    10/2004 Jung
(Continued)

FOREIGN PATENT DOCUMENTS

| EP | 1471650 | 10/2004 |
| JP | 06331730 A | 12/1994 |
| WO | 2008025427 A1 | 3/2008 |

OTHER PUBLICATIONS

British Search Report for Application No. GB1306148.6 dated Sep. 30, 2013.
(Continued)

*Primary Examiner* — Fayyaz Alam
(74) *Attorney, Agent, or Firm* — Andrus Intellectual Property Law, LLP

(57) ABSTRACT

A communications system comprising an ECM signal transmission arrangement for generating and transmitting an ECM signal, a first controller operable to control the ECM transmission arrangement such that the transmitted signal takes a pulsed form including a plurality of first periods in which the ECM signal is transmitted separated by second periods in which the ECM signal is not transmitted, a radio signal receiver arrangement forming or including a bandpass filter and arranged to receive a radio signal, and a second controller operable to control the signal received by the receiver arrangement to take a pulsed form including a plurality of third periods in which the radio signal is received by the receiver arrangement separated by fourth periods in which the radio receiver does not receive the radio signal, wherein the first and second controllers are synchronised such that the second periods are synchronised with the third periods, at the radio signal receiver arrangement such that the pulsed signal received by the receiver arrangement is reconstituted in the bandpass filter into a continuous signal, free or substantially free of ECM interference.

23 Claims, 2 Drawing Sheets

(52) U.S. Cl.
CPC ............... *H04K 3/42* (2013.01); *H04K 3/92* (2013.01); *H04K 2203/24* (2013.01)

(56) References Cited

U.S. PATENT DOCUMENTS

2007/0116093 A1* 5/2007 Karlsson ............... H04K 3/42
375/130
2011/0223851 A1* 9/2011 Stoddard ............... H04K 3/28
455/1

OTHER PUBLICATIONS

European Search Report for Application No. 14163533 dated Jul. 4, 2014.

* cited by examiner

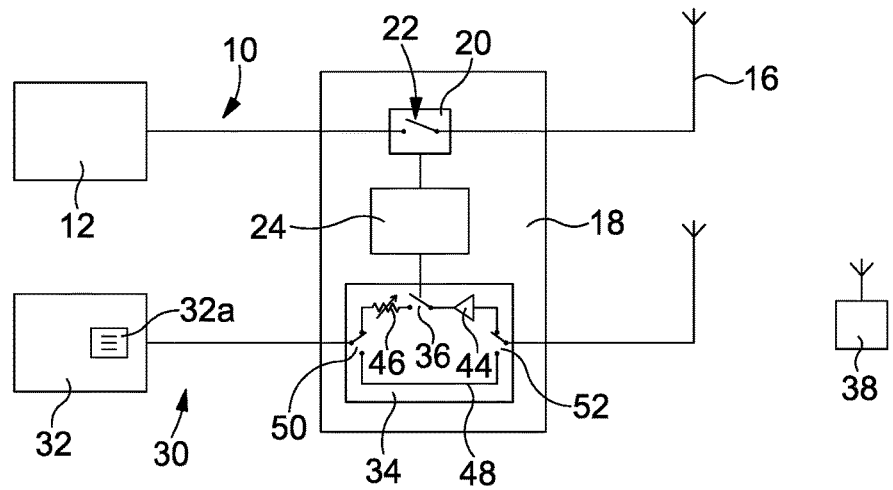
Figure 1
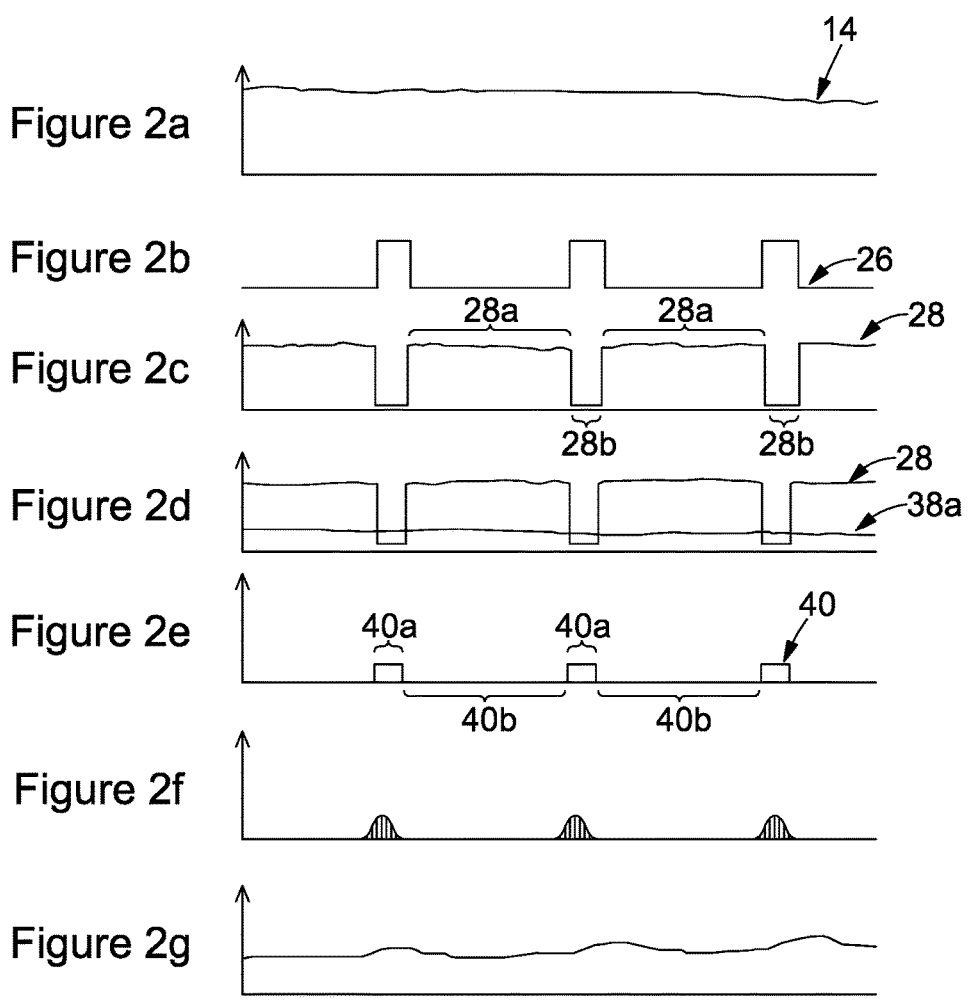
Figure 2a
Figure 2b
Figure 2c
Figure 2d
Figure 2e
Figure 2f
Figure 2g

COMMUNICATIONS SYSTEM

CROSS REFERENCE TO RELATED APPLICATION

The present application claims priority of British Patent Application No. 1306148.6, filed Apr. 5, 2013 and British Patent Application No. 1312447.4, filed Jul. 11, 2013, the contents of which are incorporated herein by reference in their entirety.

FIELD

This invention relates to a communications system, and in particular to a communications system whereby radio transmissions may be made and received whilst a nearby ECM system is operating to restrict or impair the reception of radio transmissions.

BACKGROUND

The use of ECM systems, for example by the military, to block the reception of radio transmissions transmitted by other parties is well known. By blocking the reception of radio transmissions in this manner, voice communications can be disrupted, interfering with the transmission of information or instructions, and the remote control of devices such as improvised explosive devices or other remotely detonated explosives can be disrupted. Clearly, the disruption of the detonation of improvised, or other, explosive devices is beneficial in that the risk of injury to military personnel or civilians or damage to property and equipment is reduced, and disrupting the reception of voice communications can hamper organisation of personnel.

Whilst the use of ECM systems is beneficial in that it can disrupt voice communications or the reception of control signals transmitted by other parties, it has the disadvantage that communications by those operating the ECM system are also disrupted. It is desirable to provide a communications system whereby radio communications, either for voice or data transmission, can continue to be received by a party using an ECM system whilst that system is operative and without introducing vulnerabilities such as frequency gaps into the ECM transmission.

SUMMARY

According to the present invention there is provided a communications system comprising an ECM signal transmission arrangement for generating and transmitting an ECM signal, a first controller operable to control the ECM transmission arrangement such that the transmitted signal takes a pulsed form including a plurality of first periods in which the ECM signal is transmitted separated by second periods in which the ECM signal is not transmitted, a radio signal receiver arrangement including or forming a bandpass filter and arranged to receive a radio signal, and a second controller operable such that during a plurality of third periods the radio signal is processed by at least part of the radio receiver arrangement, the third periods being separated by fourth periods in which the radio receiver arrangement does not process the radio signal, wherein the first and second controllers are synchronised such that the second periods are synchronised with the third periods, at the radio signal receiver arrangement.

By way of example, the second controller may be operable to control the signal received by the receiver arrangement so that the signal takes a pulsed form including a plurality of third periods in which the radio signal is received by the receiver arrangement separated by fourth periods in which the radio receiver does not receive the radio signal. Alternatively, the signal received by the receiver arrangement may be modified, within the receiver arrangement under the control of the second controller, so that at least part of the receiver arrangement only processes those parts of the signal received during the third periods.

It has been found that where a pulsed radio signal is passed through a bandpass filter, provided the repetition rate of the pulsed signal is greater than the bandwidth of the filter, any radio frequencies present in the pulsed signal that lie within the filter bandwidth will, in effect, be joined up and emerge from the filter as a continuous, albeit weaker, signal. Any typical radio receiver is, in effect, a tuneable bandpass filter. Accordingly, by transmitting a pulsed ECM signal, and controlling the operation of the radio signal receiver arrangement in such a manner as to receive only the signal present between pulses of the ECM signal, the pulsed signal received by the radio signal receiver arrangement can be reconstituted back into a continuous signal free from ECM interference simply by the passage of the pulsed, received signal through the radio's bandpass filter. Little modification of a typical receiver is required to allow operation thereof in accordance with the invention. Furthermore, the transmitter used to transmit the radio signal needs no modification.

The first periods may be equal in length, and the second periods equal in length, thereby defining a fixed pulse rate. Alternatively, the first and/or second periods may be of varying length, thereby defining a variable pulse rate. In either case, the pulse rate is conveniently greater than the bandwidth of the bandpass filter. It is preferably significantly greater than the bandwidth of the bandpass filter, for example it may be several times the bandwidth of the bandpass filter.

It is advantageous for the second periods to be of relatively short duration to minimise the impact on the average power and effectiveness of the ECM transmission. However, as this also requires the third periods to be short, this negatively impacts upon the received radio signal level. There is thus a trade-off between effectiveness of the ECM system and received radio signal strength. It is envisaged that operation of the communications system in such a manner that the second periods are approximately ⅛ of the length of the first periods would provide an adequate balance between the effectiveness of the ECM system and the received signal strength. This ratio may be adjusted according to operational circumstances.

The first and second controllers may form part of a single control unit. This is convenient where the ECM transmission arrangement and the radio signal receiver arrangement are adjacent one another. However, this need not always be the case. Provided adequate synchronisation can be maintained, for example by the use of a GPS based timing signal, the ECM transmission arrangement and the radio signal receiver arrangement may be spaced apart. For example, the radio signal receiver arrangement could be a mobile, possibly hand held, unit, capable of use at locations remote from the ECM transmission arrangement. The technique can also be extended to protect multiple radio receivers.

BRIEF DESCRIPTION OF THE DRAWINGS

The invention will further be described, by way of example, with reference to the accompanying drawings, in which:

FIG. 1 is a diagrammatic representation communication system in accordance with one embodiment of the invention;

FIGS. 2a to 2g are diagrammatic representations of waveforms in various parts of the system.

DETAILED DESCRIPTION

Figure 3A:
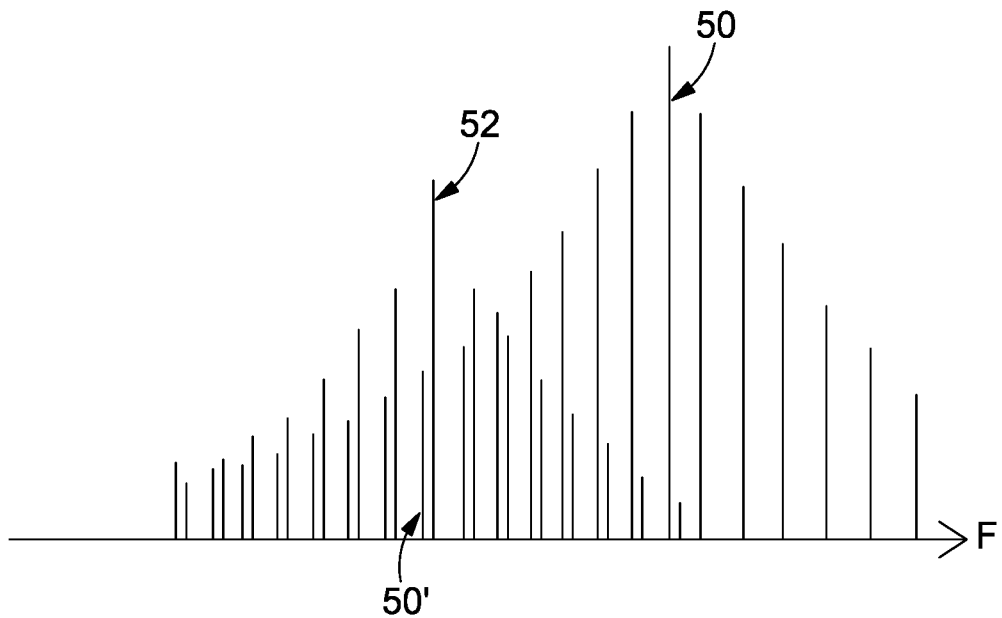
FIGS. 3a and 3b are diagrammatic representations of the effect of the use of the waveform shown in FIG. 2f.

Referring to the accompanying drawings, a communications system is illustrated which comprises an ECM signal transmission system 10 including an ECM signal generation device 12 operable to output an ECM signal 14 (see FIG. 2a) for subsequent transmission via an antenna 18. A control unit or system 18 is provided which includes a first controller 20 operable to modify the signal 14 to take a pulsed form. As illustrated, the first controller 20 may take the form of a switch 22 operable by a control device 24 in response to a control waveform 26 (see FIG. 2b) such that when the waveform 26 is low, the switch 22 is closed and the ECM signal 14 is transmitted, and when the waveform 26 is high, the switch 22 is open, and so the ECM signal 14 is not transmitted. FIG. 2c illustrates, diagrammatically, the transmitted signal 28, and it will be apparent that the signal 28 is made up of a plurality of first periods 28a in which the ECM signal 14 is transmitted, separated by second periods 28b in which the ECM signal 14 is not transmitted.

Whilst a simple switch 22 is illustrated, it will be appreciated that the function thereof may, in reality, be achieved in a number of ways. The switch function may also be integrated into the ECM system 12.

The shape of the waveform 26 is selected to ensure that the ECM signal 14 is transmitted for the majority of the time. It is envisaged that it will be transmitted for at least ⅞ of the time, but it will be appreciated that the invention is not restricted in this regard and that a wide range of other options are available without departing from the scope of the invention.

The communications system further comprises a radio signal receiver arrangement 30 including a typical radio receiver device 32 operable to demodulate a received signal in the usual manner. The control system 18 includes a second controller 34 operable to modify a received signal before the signal is supplied to the device 32. FIG. 2d is a diagrammatic representation of the received signal. and it will be appreciated that it is composed of the large transmitted ECM signal 28 superimposed over a smaller signal 38a transmitted from a remote transmitter 38. The second controller 34 includes a switch 36 controllable in a manner similar to the switch 22, but arranged to be open when the waveform 26 is low, closing when the waveform 26 is high. As a result, the signal received by the device 32 (illustrated diagrammatically in FIG. 2e and denoted by numeral 40) is of pulsed form, including a plurality of third periods 40a in which the received radio signal is passed to the device 32 separated by fourth periods 40b in which the received radio signal is not passed to the device 32.

The operation of the control system 18, and the use of a single waveform 26 in the control thereof, is such that the third periods 40a in which the received signal is passed to the device 32 are synchronised with the second periods 28b in which no ECM signal is transmitted. Accordingly, the signal received by the device 32 does not include an ECM component.

In addition to the switch 36, the second controller 34 includes a low noise amplifier 44, located upstream of the switch 36, to boost the incoming signal level and so compensate, at least in part, for some of the losses which will be experienced during subsequent parts of the processing. Downstream of the switch 36 is located a fast electronic attenuator 46 to allow shaping of the signal envelope passed to the device 32 (described in further detail below).

The radio receiver device 32 is shown much simplified in FIG. 1 but, in common with other radio receiver devices, it is essentially a bandpass filter 32a tuned to a desired signal frequency followed by a demodulator. It will be appreciated that the signal received by the device 32 is of pulsed form and, as mentioned hereinbefore, where pulsed signals are passed through a bandpass filter, the bandwidth of which is smaller than the pulse rate of the pulsed signal, the filter reconstructs or reconstitutes the signal as a continuous signal (FIG. 2g) which can be demodulated by the device 32 in the usual manner to produce an output substantially the same as the output of a radio receiver receiving the unprocessed signal in the absence of a transmitted ECM signal.

The switch 36 is ideally of fast acting form, thereby minimising the amount of signal loss whilst ensuring that the ECM signal is fully removed from the signal passed to the device 32. To further ensure that the ECM signal is fully removed. the switch 36 should preferably be of high-isolation form.

Figure 3B:
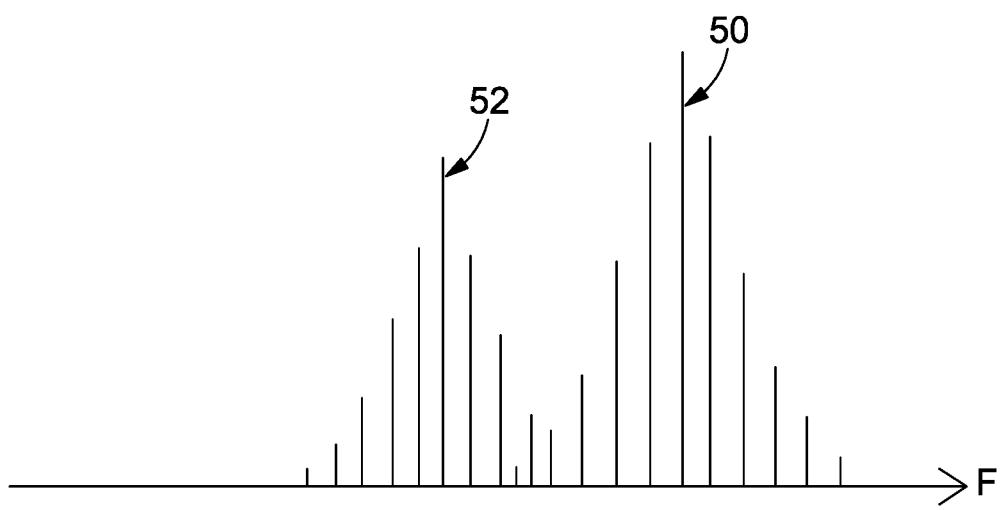

The use of switch 36 alone to divide an incoming radio signal into rectangular pulses will cause spectral spreading, creating numerous weaker images or copies of the radio signal spaced in frequency at multiples of the pulse rate Thus, as shown in FIG. 3a, a second unwanted radio signal 50 at a frequency other than the frequency of a desired signal 52 entering the switch 36 will give rise to numerous images 50', one of which could fall within the filter bandwidth of the radio receiver 32 and thus cause interference with the desired signal 52. This spectral spreading effect can be minimised, as shown in FIG. 3b, by using the attenuator 46 to smoothly vary the envelope of the pulses supplied to the device 32 so that they are not of sharp, square or rectangular form but rather are more of the form shown in FIG. 2f. A number of standard mathematical functions, known as window functions, exist to compute the shape of such envelopes to achieve an optimal effect.

As illustrated in FIG. 1, the second controller 34 preferably further includes a by-pass line 48, and relays 50, 52 controlling whether the by-pass line 48 or the switch 36 and associated components are in use, Where the device 32 is a radio transceiver, used both in the demodulation of received signals and in the transmission of signals to remote locations, when it is required to transmit a signal the relays 50, 52 are controlled in such a manner as to take the switch 36 and associated components off-line, by-passing them with the by-pass line such that the signal transmission can take place in the usual manner.

The arrangement of the invention thus allows communication to be maintained in areas in which an ECM system is in use. It can be used despite the use of a strong ECM jamming signal, strong enough to swamp the required radio signal, even where the jamming signal and the required radio signal are on the same frequency.

It will be appreciated that the communications system may be used in the transmission of voice signals or data signals, so long as the radio filter bandwidth is less than the signal pulse rate. It requires no modification to the transmitter used to transmit the subsequently received signal, and requires only limited modification of a typical radio receiver device.

Many of the components in the second controller 34 can be integrated directly into the receive path within radio 32, typically located immediately preceding filter 32a. This arrangement can allow some simplification of the design. For example, relays 50, 52 and bypass path 48 would not be required as the components are no longer in the transmit signal path, and low-noise amplifier 44 is likely to already be present at the front end of any typical radio receiver design.

Furthermore, in a software-based radio many of the components can be conveniently implemented in the radio's digital signal processing. Such a radio uses an analogue-to-digital converter to translate the incoming radio signal into a stream of data values that are then filtered and demodulated by a digital processing system. Switch 36 and attenuator 46 could be implemented as a digital multiplier immediately after the analogue-to-digital converter, multiplying each incoming data value by a value X that varies between 0 and 1. During each fourth period X is set to 0 to suppress incoming signal data, and during each third period X is set to 1 to allow signal data through unaltered. X may also be cycled smoothly between 0 and 1 using a mathematical function as described earlier to minimise any co-site interference effects. The resulting bursts of data are joined up by the subsequent digital filters in exactly the same manner as described earlier.

In the description hereinbefore, the controller 18 operates to control the signal supplied to the radio receiver arrangement 30, removing or attenuating those parts of the received signal including the transmitted ECM signal. In an alternative arrangement, the radio receiver arrangement 30 may be arranged to receive the complete received signal, including the pulses or periods during which the ECM signal is transmitted, avoiding the need to provide the switch 36 and attenuator 46. The radio receiver arrangement 30 may instead be controlled in such a manner that the pulses or periods containing the ECM signal are ignored by, for example, the final IF filter and/or demodulator of the radio receiver arrangement 30, recovering and demodulating the received signal only during the pulses or periods in which the ECM signal is not transmitted. Any suitable filtering technique may be used to recover the signal carrier and compensate for the periods during which the ECM containing pulses are being ignored. A suitable timing signal may be used to control the operation of the controller 18 in such an arrangement.

Such an arrangement would most likely be achieved by appropriate programming of a software based radio device.

Whilst in the description hereinbefore the controller 18 is described and illustrated as a separate component, this need not be the case and its functionality could be incorporated into the ECM signal transmission arrangement 10 and/or the radio signal receiver arrangement 30. Moreover the controller 18 could be divided into two parts, one controlling the ECM arrangement 10 and one controlling the radio receiver arrangement 30, and will operate correctly so long as the two parts remain synchronised.

The precise timing of the various control pulses described above may be individually adjusted and optimised to compensate for component response times and/or propagation delays in interconnecting cables. Moreover, where the ECM signal transmission arrangement 10 and radio signal receiver arrangement 30 are spaced apart from one another by a significant distance then signal propagation times could result in misalignment of the various timing periods and undesirable inclusion of part of the ECM signal into the pulsed signal passed to the device 32. Rather than have the control signals exactly synchronised, it may be preferred to have them slightly displaced from one another to compensate for such propagation delays. If the elements of the system are in fixed locations, then the delays may be fixed and built into the system. Alternatively, particularly if one or other of the elements of the system is mobile, then the GPS system or similar used to maintain synchronisation may also be used to provide position information which can then be used in the calculation of a timing offset by which the pulses are displaced relative to one another to compensate for the spacing of the elements. Alternatively it may be possible to manually adjust the displacement until a clear demodulated signal is received, or to employ an automated adaptive algorithm to monitor the received signal quality and adjust the displacement to maintain optimum performance.

As outlined earlier, there is a trade-off between ECM transmission and radio signal level. A first/second period ratio of 8/1 has been suggested for typical operation. This ratio may be adjusted manually during operation to increase the radio signal level at the expense of ECM signal level, for example to increase communication performance in an emergency situation. Various mechanisms may also be devised for automatic adjustment of this ratio; for example the second period ratio may be automatically increased for a period of time following a radio transmission to increase the receive signal strength in anticipation of a response.

In the arrangement described hereinbefore, the pulses are evenly, regularly spaced with the result that a fixed pulse rate is used. This need not be the case and arrangements in which a variable pulse rate is used are envisaged. A variable pseudo-random pulse rate will make the timing of the pulses unpredictable, helping to disguise the technique and also providing a degree of security and privacy as only radio controllers using exactly the same pseudo-random algorithm and key as the ECM controller will be able to receive communication free of the ECM signal. In such arrangements, as with the arrangement outlined hereinbefore, it is important to ensure that the required level of synchronisation is maintained, adjusted to compensate for position, etc, if required, and to ensure that the pulse rate is maintained at a level greater than the filter bandwidth.

The invention can also be used in conjunction with a responsive (or reactive) ECM system. A typical responsive ECM system contains an internal radio receiver, and pauses its ECM transmission at regular intervals to allow this receiver to scan the radio spectrum. In this arrangement, to allow the ECM system to receive without disturbance, the controller 24 will hold switch 22 closed whenever the ECM system is in its receive mode. As the ECM transmission is inherently absent during these receive periods, switch 36 may also be kept closed to maximise the radio signal level.

The invention as described hereinbefore is advantageous in that it allows a radio receiver in the vicinity of an ECM transmitter to receive signals transmitted from remotely located transmitters without requiring modification of the remote equipment. Whilst modification of the remote equipment may not be necessary, there may be circumstances in which it is desired. For example, by synchronising the operation of both the transmitter and receiver with the operation of the ECM transmitter, taking into account location and propagation times, packets of data could be transmitted, or other transmissions made, during the pulses or periods when the ECM signal is not being transmitted. The frequencies at which the transmissions are made could be varied, for example for security purposes, by appropriate frequency hopping, or they could be transmitted on a fixed frequency.

It will be appreciated that a wide range of modifications and alterations may be made to the arrangements described hereinbefore without departing from the scope of the invention as defined by the appended claims. For example, whilst the description hereinbefore relates primarily to the transmission of signals between just two locations, it will be appreciated that the system may be used between more locations than this, provided the second controllers at each location are synchronised, appropriate compensation being made for propagation times, etc.

The invention claimed is:

1. A communications system comprising an electronic countermeasures (ECM) signal transmission arrangement for generating and transmitting an ECM signal, a first controller operable to control the ECM transmission arrangement such that the transmitted ECM signal takes a pulsed form having a pulse rate including a plurality of first periods in which the ECM signal is transmitted separated by second periods in which the ECM signal is not transmitted, a radio signal receiver arrangement including or forming a bandpass filter and arranged to receive a radio signal, and a second controller operable such that during a plurality of third periods the radio signal is processed by at least part of the radio receiver arrangement, the third periods being separated by fourth periods in which the radio receiver arrangement does not process the radio signal, wherein the first and second controllers are synchronised such that the second periods are synchronised with the third periods, at the radio signal receiver arrangement such that the radio signal processed by the receiver arrangement is reconstituted in the bandpass filter into a continuous signal, free or substantially free of ECM interference, the radio signal processed by at least part of the radio receiver arrangement comprising a pulsed signal having the pulse rate that is greater than a bandwidth of the bandpass filter.

2. A system according to claim 1, wherein the second controller is operable to control the signal received by the receiver arrangement so that during the third periods the radio signal is received by the receiver arrangement and during the fourth periods the radio receiver does not receive the radio signal.

3. A system according to claim 1, wherein the signal received by the receiver arrangement is modified, within the receiver arrangement, under the control of the second controller, so that at least part of the receiver arrangement only processes those parts of the signal received during the third periods.

4. A system according to claim 3, wherein the said at least part of the receiver arrangement comprises the final IF filter and/or demodulator thereof.

5. A system according to claim 1, wherein the first periods are equal in length, and the second periods are equal in length, thereby defining a fixed pulse rate.

6. A system according to claim 1, wherein the first and/or second periods are of varying length, thereby defining a variable pulse rate.

7. A system according to claim 1, wherein the pulse rate is several times the bandwidth of the bandpass filter.

8. A system according to claim 1, wherein each second period is of relatively short duration to minimise the impact on ECM signal strength.

9. A system according to claim 1, wherein a ratio of the lengths of the first and second periods is adjustable to achieve a desired trade off between ECM effectiveness and radio receive performance.

10. A system according to claim 1, wherein the first and second controllers form part of a single control unit.

11. A system according to claim 1, wherein the first and second controllers are remote from one another.

12. A system according to claim 1, wherein a timing signal is used to maintain synchronisation of the periods.

13. A system according to claim 12, wherein the timing signal is GPS based.

14. A system according to claim 1, wherein a displacement is applied to the timing pulses and/or synchronisation to compensate for signal propagation times and/or equipment response delays.

15. A system according to claim 14, wherein the displacement is manually applied.

16. A system according to claim 14, wherein the displacement is automatically applied.

17. A system according to claim 1, wherein the pulse signal received by the receiver arrangement is of square or rectangular enveloped form.

18. A system according to claim 1, further comprising means for modifying the shape of the envelope of the signal applied to the receiver arrangement to reduce spectral spreading.

19. A system according to claim 1, further comprising at least one additional receiver arrangement adapted to receive a radio pulsed signal placed into pulsed form by a respective a second controller.

20. A system according to claim 1, wherein the first and/or second controller is integrated into the respective transmission and/or receiver arrangement.

21. A system according to claim 1, wherein the transmitter arrangement and/or receiver arrangement comprises a software-based radio, and the first and/or second controller is implemented within the signal processing functionality of the radio.

22. A system according to claim 1, further comprising a signal transmitter synchronised to make transmissions received by the radio receiver arrangement during the third periods.

23. A system according to claim 22, wherein the signal transmitter is arranged to transmit packets of data for reception by the radio receiver arrangement during the third periods.

* * * * *